US010164702B2

(12) United States Patent
Hasegawa

(10) Patent No.: US 10,164,702 B2
(45) Date of Patent: Dec. 25, 2018

(54) WIRELESS COMMUNICATION SYSTEM, MOBILE COMMUNICATION APPARATUS, AND TERMINAL DEVICE

(71) Applicant: Hitachi Kokusai Electric Inc., Tokyo (JP)

(72) Inventor: Keigo Hasegawa, Tokyo (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 0 days.

(21) Appl. No.: 15/553,601

(22) PCT Filed: Feb. 27, 2015

(86) PCT No.: PCT/JP2015/055846
§ 371 (c)(1),
(2) Date: Aug. 25, 2017

(87) PCT Pub. No.: WO2016/135947
PCT Pub. Date: Sep. 1, 2016

(65) Prior Publication Data
US 2018/0049110 A1 Feb. 15, 2018

(51) Int. Cl.
*H04B 7/185* (2006.01)
*H04W 56/00* (2009.01)
(Continued)

(52) U.S. Cl.
CPC .............. *H04B 7/185* (2013.01); *H04W 4/00* (2013.01); *H04W 48/16* (2013.01);
(Continued)

(58) Field of Classification Search
CPC .......................... H04W 56/0025; H04W 7/185
See application file for complete search history.

(56) References Cited

U.S. PATENT DOCUMENTS

| 7,787,821 B2 * | 8/2010 | Hamaguchi ......... H04M 1/7253 455/41.1 |
| 2007/0021121 A1 * | 1/2007 | Lane .................... G01S 5/0009 455/441 |

(Continued)

FOREIGN PATENT DOCUMENTS

| JP | 2009-503935 A | 1/2009 |
| JP | 2014-138334 A | 7/2014 |

(Continued)

OTHER PUBLICATIONS

Johansen et al.; "Unmanned aerial vehicle as communication relay for autonomous underwater vehicle—Field tests"; Published in: 2014 IEEE Globecom Workshops;Date of Conference: Dec. 8-12, 2014; Date Added to IEEE Xplore: Mar. 19, 2015 Electronic ISBN: 978-1-4799-7470-2; Print ISSN: 2166-0077; (Year: 2014).*

(Continued)

*Primary Examiner* — Gary Mui
(74) *Attorney, Agent, or Firm* — Mattingly & Malur, PC

(57) ABSTRACT

A wireless communication system comprises a mobile communication apparatus, and a terminal device. The mobile communication apparatus comprises a first wireless unit that wirelessly communicates control information to and from the terminal device in a first communication method, and a second wireless unit that wirelessly communicates user information to and from the terminal device in a second communication method that uses a higher frequency band than the first communication method. The terminal device comprises a third wireless unit that performs wireless communication to and from the first wireless unit, and a fourth wireless unit that performs wireless communication to and from the second wireless unit. The mobile communication apparatus or the terminal device determines a timing of wireless communication to be performed between the sec- (Continued)

ond wireless unit and the fourth wireless unit by performing wireless communication between the first wireless unit and the third wireless unit.

15 Claims, 7 Drawing Sheets

(51) Int. Cl.
H04W 4/00 (2018.01)
H04W 48/16 (2009.01)
H04W 88/06 (2009.01)
H04W 72/04 (2009.01)
H04W 4/02 (2018.01)

(52) U.S. Cl.
CPC ... *H04W 56/0025* (2013.01); *H04W 72/0446* (2013.01); *H04W 88/06* (2013.01); *H04W 4/025* (2013.01)

(56) References Cited

U.S. PATENT DOCUMENTS

| | | | |
|---|---|---|---|
| 2007/0021122 A1* | 1/2007 | Lane | H04B 7/01 455/441 |
| 2008/0305822 A1* | 12/2008 | Li | H04L 27/2608 455/522 |
| 2010/0331056 A1 | 12/2010 | Taghavi et al. | |
| 2012/0106536 A1* | 5/2012 | Natarahjan | H04L 7/042 370/347 |
| 2012/0307720 A1 | 12/2012 | Madsen et al. | |
| 2013/0127589 A1 | 5/2013 | Canora et al. | |
| 2013/0130740 A1 | 5/2013 | Saito | |
| 2014/0233412 A1* | 8/2014 | Mishra | H04W 76/10 370/252 |
| 2015/0304814 A1* | 10/2015 | Pandey | H04W 4/023 455/456.2 |
| 2016/0094968 A1* | 3/2016 | Papa | H04W 4/22 455/404.1 |

FOREIGN PATENT DOCUMENTS

WO 2007/015828 A2 2/2007
WO 2012/132184 A1 10/2012

OTHER PUBLICATIONS

Ishii Hiroyuki, et al., "A novel architecture for LTE-B: C-plane/U-plane split and Phantom Cell concept", Globecom '12 Workshop, IEEE, Dec. 3-7, 2012, pp. 624-630.
Ryu Miura, Wireless Relay Using Small Unmanned Aerial Systems, IEICE Technical Report vol. 2 No. 51, May 17, 2012, pp. 17-21, WBS2012-04.
International Search Report of PCT/JP2015/055846 dated May 26, 2017.
Japanese Office Action received in corresponding Japanese Application No. 2017-501793 dated Aug. 2, 2018.
Extended European Search Report received in corresponding European Application No. 15883241.0 dated Sep. 14, 2018.

* cited by examiner

10 BASE STATION APPLICATION APPARATUS (BA)

20 MOBILE BASE STATION (MB)

30 TERMINAL STATION (TM)

F I G . 7
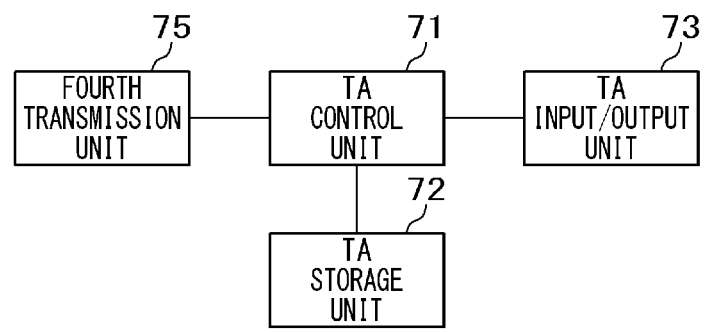
70 TERMINAL APPLICATION APPARATUS (TA)

110 BASE STATION APPLICATION APPARATUS (BA)

WIRELESS COMMUNICATION SYSTEM, MOBILE COMMUNICATION APPARATUS, AND TERMINAL DEVICE

TECHNICAL FIELD

The present invention relates to a wireless communication technique. More specifically, the present invention relates to a wireless communication technique in which a communication apparatus moves to near a terminal device to collect the information of a remote place.

BACKGROUND ART

A wireless communication technique has been used worldwide in which its communication method is standardized as a standard for each of applications, such as radio broadcasting, TV broadcasting, narrow band land radio, mobile phones, and wireless LAN (Local Area Network). The government and regulatory organization of each country performs radio frequency allocation to each application, system, and provider while considering the radio propagation characteristic different according to frequency.

Conventionally, in many wireless systems, a single frequency band is allocated to be divided into a plurality of channels for operation. In mobile phones, to accommodate more users, a plurality of frequency bands are allocated to perform area design according to operation policy. For example, there is an idea of allocating a frequency below 1 GHz to achieve non-line-of-sight communication by the diffraction effect and of using a high frequency near 2 GHz for operating a relatively small cell.

In addition, to accommodate increasing traffic, traffic offloading that performs data communication by wireless LAN not via a cellular network has been widely used in recent years. Further, attention has been drawn to a technique called HetNet in which systems having different cell radii (of a macro cell and a small cell) and methods are mixed in the same area and operate cooperatively to improve the system capacity. In the HetNet, proposed is the application of a C/U split (control plane/user plane split) technique that allows the small cell to perform only data communication and allows the macro cell to perform cell control (such as terminal control) (for example, see Patent Literature 1 and Nonpatent Literature 1).

Typically, when high speed communication is achieved, wide bandwidth transmission is required. For example, the bandwidth of 20/40/80/160 MHz is used for wireless LAN (WiFi, IEEE 802.11ac), the bandwidth of 1.4/3/5/10/15/20 MHz is used for LTE (Long Term Evolution), and the bandwidth of 2.16 GHz is used for WiGig using millimeter waves (IEEE 802.11ad). In contrast, the transmission power is limited according to inter-cell interference design and use conditions (mobile station/fixed station, and communication distance). In particular, the transmission power of the mobile station is often in the range of several mW to several hundreds mW from the viewpoint of size reduction and the life of the battery.

When the bandwidth is widened under the conditions that the transmission power is constant, the transmission power per 1 Hz (power spectral density; PSD) becomes smaller to deteriorate the signal-to-noise power ratio (SNR). This worsens the communication quality. In addition, the receiving power becomes smaller with distance. Thus, as the bandwidth is wider, long distance communication becomes more difficult.

Moreover, in the recent frequency use conditions, low frequency is overcrowded, and higher frequency can secure a wide frequency bandwidth more easily. From this, the novel system that tries to achieve high speed communication tends to use high frequency. However, since higher frequency tends to increase the propagation loss, the service to a wide area including long distance communication and non-line-of-sight communication is difficult.

CITATION LIST

Patent Literature

PTL 1: Japanese Patent Application Laid-Open No. 2014-138334

Nonpatent Literature

NPL 1: Ishii Hiroyuki and two others, "A novel architecture for LTE-B: C-plane/U-plane split and Phantom Cell concept", Globecom '12 Workshop, (the United States), IEEE, Dec. 3-7, 2012, p. 624-630

SUMMARY OF INVENTION

Technical Problem

Based on the above background, considered is a case where a temporary line for collecting the information of a remote place is constructed, for example, when a large scale disaster occurs so that the existing communication infrastructure is strained or malfunctions.

Although there has been a technique that performs relay transmission by using a large number of wireless links in order to perform long distance transmission, much time is spent for installing relay stations in the disaster-stricken region. In addition, in the relay transmission using a communication satellite, it is necessary to bring expensive VSAT (Very Small Aperture Terminal) earth station equipment into the disaster-stricken region. Further, since a commercial satellite shares the band with the existing users, easy use of the commercial satellite as a temporary large capacity line is difficult.

An object of the present invention is to provide a wireless communication technique capable of easily collecting the information of a remote place.

Solution to Problem

The representative configurations of a wireless communication system of the present invention for solving the above problems are as follows. That is, the present invention provides a wireless communication system that comprises a mobile communication apparatus that performs communication while moving, and a terminal device that performs wireless communication to and from the mobile communication apparatus. The mobile communication apparatus comprises a first wireless unit that wirelessly communicates control information to and from the terminal device in a first communication method, and a second wireless unit that wirelessly communicates user information to and from the terminal device in a second communication method that uses a higher frequency band than the first communication method. The terminal device comprises a third wireless unit that performs wireless communication to and from the first wireless unit, and a fourth wireless unit that performs wireless communication to and from the second wireless unit. The mobile communication apparatus or the terminal device determines a timing of wireless communication to be performed between the second wireless unit and the fourth wireless unit by performing wireless communication between the first wireless unit and the third wireless unit.

In addition, the representative configurations of a mobile communication apparatus of the present invention are as follows. That is, the present invention provides a mobile communication apparatus that performs communication to and from a terminal device while moving including a first wireless unit that wirelessly communicates control information to and from the terminal device in a first communication method, and a second wireless unit that wirelessly communicates user information to and from the terminal device in a second communication method that uses a higher frequency band than the first communication method. The mobile communication apparatus determines a timing of wireless communication to be performed by using the second wireless unit by performing wireless communication to and from the terminal device by using the first wireless unit.

In addition, the representative configurations of a terminal device of the present invention are as follows. That is, the present invention provides a terminal device that performs wireless communication to and from a mobile communication apparatus that performs communication while moving including a third wireless unit that wirelessly communicates control information to and from the mobile communication apparatus in a first communication method, and a fourth wireless unit that wirelessly communicates user information to and from the mobile communication apparatus in a second communication method that uses a higher frequency band than the first communication method. The terminal device determines a timing of wireless communication to be performed by using the fourth wireless unit by performing wireless communication to and from the mobile communication apparatus by using the third wireless unit.

Advantageous Effects of Invention

According to the above configurations, the information of a remote place can be easily collected.

BRIEF DESCRIPTION OF DRAWINGS

FIG. 7 is a block diagram of a terminal application apparatus according to the fifth embodiment of the present invention.

DESCRIPTION OF EMBODIMENTS

First Embodiment

Hereinafter, a first embodiment of the present invention will be described with reference to the drawings.

Figure 1:
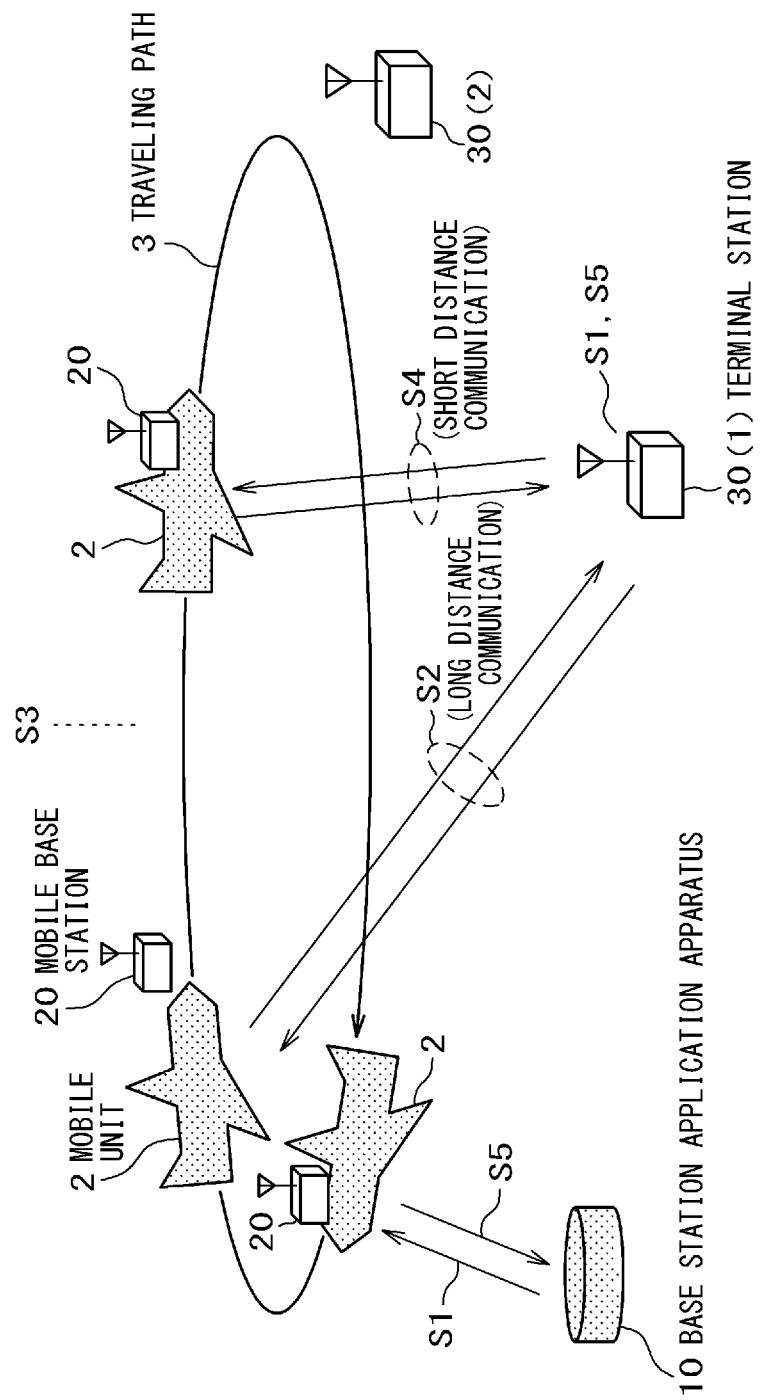
FIG. 1 is a block diagram of a wireless communication system according to a first embodiment of the present invention.

FIG. 1 is a block diagram of a wireless communication system according to the first embodiment. The wireless communication system of the first embodiment includes a base station application apparatus 10, a mobile base station 20, and a terminal station 30.

An Overview of the Wireless Communication System

In the wireless communication system according to the first embodiment, the mobile base station 20 and the terminal station 30 are provided with a long distance communication function for preparing short distance communication, and a short distance communication function for data transmission. The mobile base station 20 performs communication to and from the terminal station 30 by using the long distance communication function while moving, and schedules a timing of short distance communication to be performed. Then, the mobile base station 20 and the terminal station 30 perform short distance communication at the scheduled timing.

The mobile base station 20 previously receives information to be transmitted to the terminal station 30 from the base station application apparatus 10 disposed at a base point, moves from the base point to a location where the mobile base station 20 can perform short distance communication to and from the terminal station 30, and transmits the communication information by the short distance communication to and from the terminal station 30. In addition, the mobile base station 20 returns to the base point, and transmits information collected from the terminal station 30 to the base station application apparatus 10 at the base point.

The base station application apparatus 10 is provided with the function of transmitting, storing, and displaying the information that the mobile base station 20 collects from the terminal station 30, and the function of inputting, storing, and transmitting the information to be transmitted to the terminal station 30.

The long distance communication function enables communication of a longer distance than the communicatable distance of short distance communication, and uses a system that can transmit a signal having a lower frequency, a narrower band, and a higher output than the short distance communication function. For example, by applying the existing communication methods, considered are a combination of long distance communication using a system, such as WiMAX and LTE, and short distance communication using millimeter wave communication, and a combination of long distance communication using narrow band radio, such as LMR (Land Mobile Radio), and short distance communication using a cellular system, such as WiMAX and LTE.

The Detail of the Configuration of the Wireless Communication System

The base station application apparatus 10 is, for example, fixed and installed, and performs data transmission to and from the mobile base station 20. This data transmission may be performed by wireless communication or wire communication. Alternatively, data may be stored in a storage medium, such as a magnetic disk and a semiconductor memory, and the storage medium may be transmitted and received. In the first embodiment, the base station application apparatus 10 performs wire communication to and from the mobile base station 20.

The mobile base station 20 is mounted on a movable mobile unit 2, for example, an aerial vehicle, and performs data transmission to and from the base station application apparatus 10. The mobile unit 2 is, for example, an unmanned aerial vehicle (drone) by wireless operation or a GPS (Global Positioning System) navigation method. In addition, the mobile base station 20 performs data transmission to and from the terminal station 30 by wireless communication.

The terminal station 30 is disposed in, for example, a place that a human cannot approach easily or a place where long time stay is dangerous (for example, a disaster site). The terminal station 30 is thrown down from, for example, the unmanned aerial vehicle, and in this embodiment, is fixed and installed, but may be movable in the range in which the timing of short distance communication that will be described later is not changed. In the example of FIG. 1, the terminal station 30 includes two terminal stations 30(1) and 30(2). The terminal station 30 is called as a representative of the terminal stations 30(1) and 30(2) in the description.

In the example of FIG. 1, the mobile base station 20 is mounted on the aerial vehicle, and goes round and moves along a predetermined traveling path 3 closed in a loop. It is noted that the traveling path 3 is not required to be in the loop, and is not required to be the predetermined path.

In the example of FIG. 1, one base station application apparatus 10, one mobile unit 2 on which the mobile base station 20 is mounted, and one mobile base station 20 are provided. However, a plurality of base station application apparatuses 10, mobile units 2, and mobile base stations 20 may be provided. In addition, one or three or more terminal stations 30 can be provided.

Base Station Application Apparatus

Figure 2:
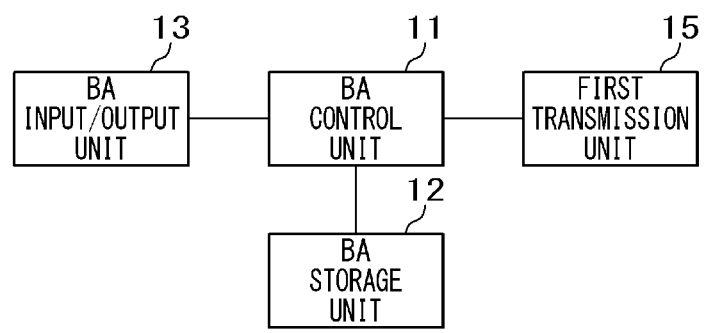
FIG. 2 is a block diagram of a base station application apparatus according to the first embodiment of the present invention.

FIG. 2 is a block diagram of the base station application apparatus according to the first embodiment.

As illustrated in FIG. 2, the base station application apparatus (BA) 10 of the first embodiment includes a BA control unit 11, a BA storage unit 12, a BA input/output unit 13, and a first transmission unit 15.

The BA control unit 11 controls each configuring unit of the base station application apparatus 10 and the operation of the entire base station application apparatus 10.

The first transmission unit 15 is provided with an interface function for transmitting and receiving data to and from the mobile base station 20, and is controlled by the BA control unit 11 to perform transmission of data held by the storage unit of the mobile base station 20 (MB storage unit 22) and data held by the storage unit of the base station application apparatus 10 (BA storage unit 12) between the MB storage unit 22 and the BA storage unit 12.

The BA storage unit 12 is controlled by the BA control unit 11 to hold data received from the terminal station 30 via the mobile base station 20 and to hold data to be transmitted to the terminal station 30 via the mobile base station 20. The data to be transmitted to the terminal station 30 is data that is input from the BA input/output unit 13.

The BA input/output unit 13 is a various-information input/output unit, and corresponds to, for example, the keyboard and display of a personal computer (PC). The user inputs information to be transmitted to the terminal station 30 via the mobile base station 20 to the BA input/output unit 13, and the BA input/output unit 13 displays the information received from the terminal station 30 via the mobile base station 20. The information to be input and output may be information, such as voice information, sensor information, and a camera image. The information that is input to the BA input/output unit 13 is held by the BA storage unit 12. The information that is output to the BA input/output unit 13 is the information held by the BA storage unit 12.

In this way, the base station application apparatus 10 can be achieved by a notebook PC.

Mobile Base Station

Figure 3:
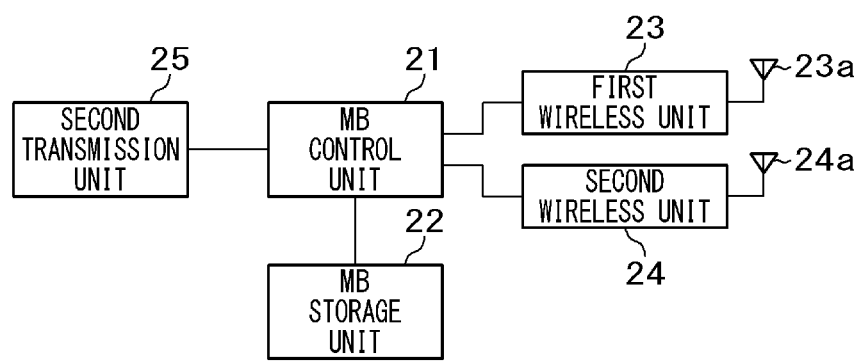
FIG. 3 is a block diagram of a mobile base station according to the first embodiment of the present invention.
Figure 4:
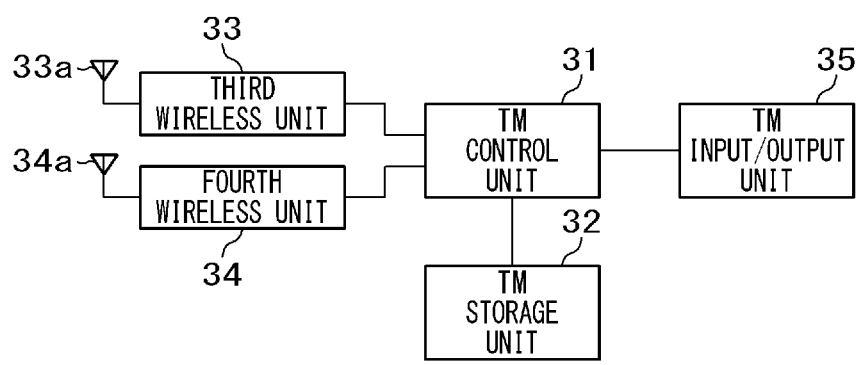
FIG. 4 is a block diagram of a terminal station according to the first embodiment of the present invention.

FIG. 3 is a block diagram of the mobile base station according to the first embodiment.

As illustrated in FIG. 3, the mobile base station (MB) 20 of the first embodiment includes an MB control unit 21, the MB storage unit 22, a first wireless unit 23, a second wireless unit 24, and a second transmission unit 25. The first wireless unit 23 includes an antenna 23a for transmitting and receiving an electric wave, and the second wireless unit 24 includes an antenna 24a for transmitting and receiving an electric wave.

The first wireless unit 23 is provided with the function of a first communication method for the long distance communication (communication method A) for directly or indirectly transmitting control plane information (control information). The first wireless unit 23 is not necessarily required to have a complete base station function, and can be made smaller and can have low power consumption by using a device, such as SoC (System-on-a-chip) that is developed for a terminal using a typically widespread communication method.

The antenna 23a can also improve the communication quality and increase the communicatable time by changing its direction according to the position of the terminal station 30 that is the party on the other end. In addition, when the first wireless unit 23 indirectly performs communication to and from the terminal station 30 via the regular base station (the base station connected to the core network) in the communication method A, a collinear antenna that performs intense radiation in the horizontal direction can be used as the antenna 23a, and this antenna can be hung down from the mobile unit 2 to perform transmission and reception to and from the remote regular base station.

The second wireless unit 24 is provided with the base station (master station) function in a second communication method for short distance communication (communication method B) for directly transmitting user plane information (user information) as user data to and from the terminal station 30. This communication method B uses a higher frequency B and a wider bandwidth than the method of the first wireless unit 23. Preferably, the direction of the antenna 24a is changed according to the position of the terminal station 30 that is the party on the other end.

It is noted that the base station or the master station herein means a radio station having the function of instructing a timing of wireless transmission to another station as a slave station by wirelessly transmitting some type of synchronous signal.

As described later, preferably, the second wireless unit 24 simplifies the functions of PHY (physical layer: a first layer) and a MAC layer (Media Access Control layer: a second layer), and can be processed by a low-power processor. In addition, preferably, the antenna that is disposed in the mobile unit 2 so as to have appropriate downward directivity is used as the antenna 24a, and performs transmission and reception to and from the terminal station 30. In the application in which there is very few outgoing data from the mobile base station 20 to the terminal station 30, the transmission that is performed by the second wireless unit 24 at the high frequency B may perform only reception (incoming), and outgoing control plane information and user plane information may be transmitted from the first wireless unit 23.

When the first wireless unit 23 uses the message and signal of the control plane in the communication method A according to its using way, the first wireless unit 23 can be said to be the base station in the communication method A (phantom base station). In addition, when the second wireless unit 24 uses the control message in the communication method B or of its own (also including the control message that is transmitted by the user plane information in the communication method A), the second wireless unit 24 can be said to be the base station in the communication method B (small cell base station). In the first embodiment, at least one of the first wireless unit 23 and the second wireless unit 24 is provided with the base station function.

The MB storage unit 22 includes, for example, an SSD (Solid State Drive) having a write and read speed at several hundreds MB/s, and is provided with the function of holding user information to be transmitted to the terminal station 30, and the function of holding information received from the terminal station 30.

The second transmission unit 25 is an interface for transmitting and receiving data to and from the base station application apparatus 10, and in this embodiment, is connected by wire to the first transmission unit 15 of the base station application apparatus 10. When the memory of the MB storage unit 22 can be easily replaced with the BA storage unit 12 of the base station application apparatus 10 like a memory card, the second transmission unit 25 is not necessarily required.

The MB control unit 21 controls each configuring unit of the mobile base station 20 and the operation of the entire mobile base station 20. For example, the MB control unit 21 cooperates with the navigation apparatus of the unmanned aerial vehicle as the mobile unit 2, controls the start of the power sources of the first wireless unit 23 and the second wireless unit 24 (that is, the supply of electric power to the first wireless unit 23 and the second wireless unit 24) and the stop thereof according to the position during flight, and performs the previous preparation of communication data using the communication method B.

In addition, the MB control unit 21 starts the long distance communication function of the first wireless unit 23 (communication method A), and performs, for example, periodically, the transmission of the notification channel to notify the presence of the mobile base station 20 to the terminal station 30. Further, the MB control unit 21 determines a timing at which the short distance communication function in the communication method B can be started and used by using the position information, traveling path, and traveling speed of the mobile base station 20 and the position information of the terminal station 30. The position information and the traveling path information are information that is designated by, for example, a latitude and a longitude. Each of the position information of the mobile base station 20 and the position information of the terminal station 30 is obtained by, for example, GPS.

Moreover, the MB control unit 21 starts the short distance communication function in the communication method B at the scheduled communication time, and performs control so as to perform data transmission between the mobile base station 20 and the terminal station 30 within the scheduled communication time.

Moreover, the MB control unit 21 transmits data received from the terminal station 30 to the base station application apparatus 10, and also transmits data received from the base station application apparatus 10 to the terminal station 30.

Terminal Station

The terminal station 30 includes a TM control unit 31, a TM storage unit 32, a third wireless unit 33, a fourth wireless unit 34, and a TM input/output unit 35. The third wireless unit 33 includes an antenna 33a for transmitting and receiving an electric wave, and the fourth wireless unit 34 includes an antenna 34a for transmitting and receiving an electric wave.

The third wireless unit 33 performs wireless communication to and from the first wireless unit 23 of the mobile base station 20 by using the communication method A. The fourth wireless unit 34 performs wireless communication to and from the second wireless unit 24 of the mobile base station 20 by using the communication method B.

The TM storage unit 32 is provided with the function of holding user information to be transmitted to the base station application apparatus 10 via the mobile base station 20, and the function of holding user information received from the base station application apparatus 10 via the mobile base station 20. Desirably, the TM storage unit 32 has the same write and read speed as the MB storage unit 22.

The TM control unit 31 controls each configuring unit of the terminal station 30 and the operation of the entire terminal station 30. For example, the TM control unit 31 transmits and receives control information, such as the mutual position information, to and from the mobile base station 20, and controls the start and stop of the power sources of the third wireless unit 33 and the fourth wireless unit 34 according to the communication schedule.

Specifically, the TM control unit 31 starts the long distance communication function of the third wireless unit 33 (communication method A) to start search for the mobile base station 20. In addition, the TM control unit 31 performs the demodulation process of the receiving signal when the demodulation process of the data received from the mobile base station 20 is not completed.

Moreover, the TM control unit 31 starts the short distance communication function in the communication method B at the scheduled communication time, and performs control so as to perform data transmission between the mobile base station 20 and the terminal station 30 within the scheduled communication time.

Each of the BA control unit 11, the MB control unit 21, and the TM control unit 31 is provided with, as hardware configuration, a CPU (Central Processing Unit) and a memory that stores the operation program of each control unit. The CPU operates according to the operation program.

Each of the BA storage unit 12, the MB storage unit 22, and the TM storage unit 32 includes a semiconductor memory (a flash memory, a RAM (Random Access Memory), and a ROM (read only memory)), and a magnetic disk.

The Operation of the Wireless Communication System

The operation of the wireless communication system according to the first embodiment will be described below with reference to FIG. 1. This operation is performed in the order of steps 1 to 5.

Step 1: S1

Data is transmitted (uploaded) from the base station application apparatus 10 to the mobile base station 20. The data transmitted is the data of a file that is previously input from the BA input/output unit 13 of the base station application apparatus 10 and stored in the BA storage unit 12.

In addition, in the terminal station 30(1), data is previously input from the TM input/output unit 35, and the file of the input data is stored in the TM storage unit 32. In step 1, the data is stored in at least one of the BA storage unit 12 and the TM storage unit 32.

The data stored in the BA storage unit 12 and the TM storage unit 32 may be information that is subjected to the compression process and the information of an I/Q (Inphase/Quadrature) signal that is previously subjected to the base band modulation process (off-line signal process). By previously subjecting the data to such processes, for example, the modulation process in each wireless unit of the mobile base station 20 and the terminal station 30(1) is not required, and the wireless unit can be reduced in size and simplified. Previously subjecting the data to the compression process and the modulation process is suitable, especially when the weight of the mobile base station 20 mounted on the mobile unit 2 is strictly limited and when the terminal station 30 is required to be reduced in size and weight.

In this way, at least one of the mobile base station 20 and the terminal station 30 may hold the digital signal that has been converted from the receiving signal, and may allow the separately provided receiving device (base station application apparatus 10) to perform the demodulation and decoding processes and the reception process of an upper layer.

Step 2: S2

The MB control unit 21 of the mobile base station 20 starts the long distance communication function of the first wireless unit 23 (communication method A), and starts the transmission of the notification channel to notify the presence of the mobile base station 20 the terminal station 30(1). In this way, the mobile base station 20 moves toward the remote area while repeatedly transmitting the notification channel in the communication method A.

In addition, the TM control unit 31 of the terminal station 30(1) starts the long distance communication function of the third wireless unit 33 (communication method A), and starts search for the mobile base station 20. That is, preamble signal reception is started by the physical channel corresponding to the notification channel. In this way, even when the mobile base station 20 cannot directly perform wireless communication (long distance communication) to and from the terminal station 30(1) near the base point where the base station application apparatus 10 is placed, the mobile base station 20 can perform the wireless communication to and from the terminal station 30(1) by using the long distance communication function by moving close to the remote area in which the terminal station 30(1) is placed, and thus, both the mobile base station 20 and the terminal station 30(1) can detect the mutual presence.

Specifically, the mobile base station 20 and the terminal station 30(1) use the long distance communication function in the communication method A to exchange the position information of the terminal station 30(1) and the information of the designation of data requested from the reception side (re-transmission data), the size of data to be transmitted, the transmission parameter (modulation method), and the traveling path and traveling speed of the mobile base station 20.

In the first embodiment, the mobile base station 20 is provided with the base station function, and transmits, intermittently and repeatedly (for example, periodically), information including a mobile base station ID as an identifier designating the mobile base station 20 (notification channel information). The terminal station 30(1) receives the mobile base station ID from the mobile base station 20, and transmits information including the position information of the terminal station 30(1) and a terminal station (1) ID as an identifier designating the terminal station 30(1) to the mobile base station 20.

In the first embodiment, a plurality of terminal stations 30 do not perform transmission as long as the terminal stations 30 are not called from the mobile base station 20. Thus, since the plurality of terminal stations 30 do not perform transmission at the same time, radio interference can be prevented.

The mobile base station 20 receives the terminal station (1) ID from the terminal station 30(1), and identifies that the terminal station 30(1) is present within the range in which long distance communication is enabled. Then, the mobile base station 20 schedules a timing at which the short distance communication function (high speed communication function) in the communication method B can be used, that is, a timing at which the mobile base station 20 can perform communication to and from the terminal station 30(1) by using the communication method B, by using the position information, traveling path, and traveling speed of the mobile base station 20 and the position information of the terminal station 30(1), and transmits the timing information (for example, time information) to the terminal station 30(1).

The timing information should designate the timing, may be, for example, time information representing time, and may be time information representing the time until the mobile base station 20 starts communication to and from the terminal station 30(1) by using the communication method B.

For example, the mobile base station 20 calculates the position or time in which the distance to the terminal station 30(1) is below a predetermined distance in the navigation route when the unmanned aerial vehicle as the mobile unit 2 is a fixed wing aerial vehicle and the annular turning navigation route is previously programmed. When the unmanned aerial vehicle is a rotary wing aerial vehicle, the mobile base station 20 is changed to the navigation route so that the mobile base station 20 moves to immediately above the terminal station 30(1) for hovering to perform communication scheduling, that is, determines a timing to perform communication to and from the terminal station 30(1) by using the communication method B, and transmits the timing information to the terminal station 30(1).

When the terminal station 30(1) receives the timing information using the communication method B from the mobile base station 20, the terminal station 30(1) does not require long distance communication using the communication method A, and stops the long distance communication function (the function of the third wireless unit 33). Specifically, the power supply to the third wireless unit 33 is stopped. Thus, the terminal station 30(1) can reduce the power consumption.

In contrast, for the presence of another terminal station 30, for example, the terminal station 30(2), the mobile base station 20 continues the starting state of the long distance communication function even after determining the timing using the communication method B with respect to the terminal station 30(1). That is, the mobile base station 20 intermittently and repeatedly transmits the notification channel information (including the mobile base station ID as an identifier designating the mobile base station 20).

Like the terminal station 30(1), the terminal station 30(2) receives the mobile base station ID information from the mobile base station 20, and transmits the position information of the terminal station 30(2) and a terminal station (2) ID as an identifier designating the terminal station 30(2) to the mobile base station 20.

The mobile base station 20 receives the information from the terminal station 30(2) including the terminal station (2) ID, identifies that the terminal station 30(2) is present within the range in which long distance communication is enabled, schedules a timing at which the mobile base station 20 can perform communication to and from the terminal station 30(2) by using the communication method B, by using the position information, traveling path, and traveling speed of the mobile base station 20 and the position information of the terminal station 30(2), and transmits the timing information to the terminal station 30(2).

Thus, in the first embodiment, the mobile base station 20 schedules the timing at which the mobile base station 20 can perform wireless communication to and from the terminal station 30 by the short distance communication function in the communication method B (high speed communication function), and notifies the timing to the terminal station 30.

Step 3: S3

The mobile base station 20 and the terminal station 30 prepare data so as to perform transmission within the scheduled communication time. For example, when the compression process and the modulation process of the data are not performed in step 1, the compression process and the modulation process may be previously performed. In addition, when it is determined that all the previously uploaded data (data held by the MB storage unit 22 and the TM storage unit 32) cannot be communicated within the scheduling time, the priority order of transmission may be given and the flight plan itself of the aerial vehicle may be changed.

Further, when wireless communication is performed in the communication method B by using millimeter waves, the directivity control of the antennas 24a and 34a is important. Thus, the directivity control and change of the direction of the antennas 24a and 34a may be previously performed. When it is difficult to perform the electronic directivity control of a phased array by transmission, the directivity control of only reception may be performed.

Step 4: S4

The mobile base station 20 and the terminal station 30 start the short distance communication function in the communication method B at the scheduled communication time, and perform data transmission between the mobile base station 20 and the terminal station 30 within the scheduled communication time. The transmission side transmits the radio signal constructed by the frame including the known preamble signal and indicated by the serial number.

At this time, the connection between the mobile base station 20 and the terminal station 30 is maintained only by very simple MAC in the communication method B or without the MAC like the transmission method of FPU (Field Pickup Unit). When there is a reception error, the reception side holds the serial number of the frame in which the reception error occurs, and makes a communication schedule to re-transmit the frame at the time of next communication to and from the party on the other end.

The data transmitted from the party on the other end is held by the MB storage unit 22 and the TM storage unit 32. The data may be subjected to the demodulation and decoding processes, and may be held in the form of an I/Q signal so that demodulation is later enabled by the high level equalization process by the base station application apparatus 10. However, when the data is held in the form of the I/Q signal, the data size becomes huge. Thus, desirably, signal compression used by CPRI (Common Public Radio Interface) by using FPGA (Field-Programmable Gate Array) is applied.

Preferably, the terminal station 30 stops the short distance communication function (specifically, stops the power supply to the fourth wireless unit 34) after the completion of data communication, thereby reducing the power consumption. The terminal station 30 restarts the long distance communication function to perform transmission and standby of the message of the control plane, when necessary. In addition, preferably, the mobile base station 20 stops the short distance communication function (specifically, stops the power supply to the second wireless unit 24) after the completion of data communication, thereby reducing the power consumption.

Step 5: S5

The mobile base station 20 returns to the base point near the base station application apparatus 10, and transmits (downloads) the data received from the terminal station 30 to the base station application apparatus 10. If in step 4, the demodulation process of the data received from the terminal station 30 is not completed, the demodulation process of the receiving signal is performed in the base station application apparatus 10. In addition, the demodulation process of the data received from the mobile base station 20 is not completed, the demodulation process of the receiving signal is performed in the terminal station 30.

When the data communication between the mobile base station 20 and the terminal station 30 is repeatedly performed, steps 1 to 5 are repeatedly executed.

In the above description, the long distance communication function (communication method A) of the terminal station 30 is stopped when the scheduling of the communication is completed, but the long distance communication function may be maintained until data transfer in the short distance communication function (communication method B) is completed. Thus, by such a configuration, re-transmission in the communication method B can be instantly performed.

For example, the Ready message for flow control and the frame re-transmission request message are transmitted by the control plane in the communication method A from the reception side. When the transmission side receives the Ready message from the reception side, the transmission side burst-transmits a predetermined amount of data. When an error is detected by the reception side, the re-transmission request message (Selective Nack) representing its frame number is reached from the reception side, and the transmission side re-transmits only the corresponding frame.

When the terminal station 30 is the transmission side, and at the completion of data transmission, there is no re-transmission request message from the reception side (or Ack is received), the connection of the long distance communication function (communication method A) of the terminal station 30 is released. When the terminal station 30 is the reception side, and there is no re-transmission request of the terminal station 30, the connection of the long distance communication function (communication method A) of the terminal station 30 is released.

According to the first embodiment, at least the following effects are exerted.

(A1) The mobile communication apparatus (mobile base station 20) is provided with the first wireless unit that wirelessly communicates control information in the first communication method, and the second wireless unit that wirelessly communicates user information in the second communication method that uses a higher frequency band than the first communication method. The terminal device (terminal station 30) is provided with the third wireless unit that performs wireless communication to and from the first wireless unit, and the fourth wireless unit that performs wireless communication to and from the second wireless unit. The mobile communication apparatus or the terminal device determines a timing of wireless communication to be performed between the second wireless unit and the fourth wireless unit by performing wireless communication between the first wireless unit and the third wireless unit. Thus, the information of a remote place can be collected even without using relay transmission and satellite communication.

(A2) The mobile communication apparatus performs wireless communication to and from the terminal device by using the first wireless unit to determine the timing, and transmits timing information representing the timing to the terminal device by using the first wireless unit. The terminal device receives the timing information by the third wireless unit, and performs communication to and from the mobile communication apparatus by using the fourth wireless unit at the timing represented by the received timing information. Thus, the system transmitting information between one mobile communication apparatus and a plurality of terminal devices can be easily achieved.

(A3) The application apparatus (base station application apparatus 10) that performs communication to and from the mobile communication apparatus transmits first information to the mobile communication apparatus. The mobile communication apparatus receives the first information, stores the received first information, wirelessly transmits the stored first information to the terminal device at the timing. The terminal device receives the timing information, and receives the first information at the timing represented by the received timing information. Thus, the information can be transmitted between the application apparatus at the base point and the terminal device.

(A4) The terminal device wirelessly transmits second information that is input from the terminal input/output unit and stored in the terminal storage unit to the mobile communication apparatus at the timing. The mobile communication apparatus receives the second information, stores the received second information, and transmits the stored second information to the application apparatus. Thus, the information that is input from the terminal device can be transmitted to the application apparatus.

(A5) The mobile communication apparatus performs wireless communication between the first wireless unit and the third wireless unit, obtains the position information of the terminal device from the terminal device, and determines the timing by using the terminal position information and the position information, traveling path, and traveling speed of the mobile communication apparatus. Thus, the timing can be easily obtained.

(A6) At least one of the mobile communication apparatus and the terminal device performs wireless communication between the second wireless unit and the fourth wireless unit in the second communication method at the timing, and stops the operation of the second wireless unit or the fourth wireless unit. Thus, the power consumption of at least one of the mobile communication apparatus and the terminal device can be reduced.

(A7) The terminal device stops the wireless communication of the third wireless unit in the first communication method after determining the timing, performs wireless communication between the second wireless unit and the fourth wireless unit in the second communication method, and restarts the wireless communication of the third wireless unit. Thus, the power consumption of the terminal device can be reduced.

(A8) The first communication method uses the signal having a narrower bandwidth and a higher output than the second communication method. Thus, the first communication method enables longer distance communication than the second communication method.

(A9) The application apparatus transmits the IQ information that is the value of the IQ signal subjected to the modulation process in the second wireless unit with respect to the first information, to the mobile communication apparatus. The mobile communication apparatus stores the received IQ information, and transmits the stored IQ information to the terminal device at the timing. Thus, the mobile communication apparatus can be reduced in size and simplified.

Second Embodiment

Next, a wireless communication system of the second embodiment will be described.

In the first embodiment that has been described above, the timing at which communication using the communication method B is enabled is scheduled by the mobile base station 20, but the terminal station 30 can also schedule the timing. The second embodiment is different from the first embodiment only in that the terminal station 30 schedules the timing. That is, the second embodiment is different from the first embodiment only in the functions of the MB control unit 21 and the TM control unit 31.

In the second embodiment, the mobile base station 20 transmits, for example, periodically, information including the position information, traveling path, and traveling speed of the mobile base station 20 and the mobile base station ID (notification channel information) by using the communication method A. When there are a plurality of mobile base stations 20, radio interference is prevented, for example, by setting the transmission times of the notification channel information transmitted by the mobile base stations 20 so that they are not overlapped.

For example, the terminal station 30(1) receives the information including the position information, traveling path, and traveling speed from the mobile base station 20, schedules a timing at which communication to and from the mobile base station 20 in the communication method B is enabled by using the position information, traveling path, and traveling speed of the mobile base station 20 and the position information of the terminal station 30(1), and transmits the timing information to the mobile base station 20.

Then, the mobile base station 20 and the terminal station 30(1) perform data transmission by wireless communication using the communication method B at the timing.

According to the second embodiment, at least the following effects are exerted.

(B1) The terminal device performs wireless communication to and from the mobile communication apparatus by using the third wireless unit to determine the timing, and transmits timing information representing the timing to the mobile communication apparatus by using the third wireless unit. The mobile communication apparatus receives the timing information by the first wireless unit, and performs communication to and from the terminal device by using the second wireless unit at the timing represented by the received timing information. Thus, when information is transmitted between a plurality of mobile communication apparatuses and one terminal device, the wireless communication system can be easily achieved.

(B2) The terminal device performs wireless communication between the first wireless unit and the third wireless unit, obtains the position information, traveling path, and traveling speed of the mobile communication apparatus from the mobile communication apparatus, and determines the timing by using the position information, traveling path, and traveling speed of the mobile communication apparatus and the position information of the terminal device. Thus, the timing can be easily obtained.

Third Embodiment

Next, a wireless communication system of a third embodiment will be described.

In the first and second embodiments that have been described above, the mobile base station 20 is provided with the base station function, but the terminal station 30 can also be provided with the base station function, and the mobile base station 20 can schedule the timing. The third embodiment is different from the first embodiment only in that the terminal station 30 is provided with the base station function. That is, the third embodiment is different from the first embodiment only in the functions of the MB control unit 21 and the TM control unit 31. It is noted that in the third embodiment, the mobile base station 20 of the first embodiment is called a mobile station 20.

In the third embodiment, the terminal station 30 is provided with the base station function, and transmits, for example, periodically, information including the terminal station ID designating the terminal station 30 and the position information of the terminal station 30 (notification channel information) by using the communication method A. When there are a plurality of terminal stations 30, radio interference is prevented, for example, by setting the transmission times of the notification channel information transmitted by the terminal stations 30 so that they are not overlapped.

The mobile station 20 of the third embodiment receives, for example, the terminal station (1) ID and the position information from the terminal station 30(1), schedules a timing at which communication to and from the terminal station 30(1) is enabled in the communication method B by using the position information, traveling path, and traveling speed of the mobile station 20 and the position information of the terminal station 30(1), and transmits the timing information to the terminal station 30(1).

Then, the mobile station 20 and the terminal station 30(1) perform data transmission by wireless communication using the communication method B at the timing.

According to the third embodiment, at least the same effects as (A2) and (A5) of the first embodiment are exerted.

Fourth Embodiment

Next, a wireless communication system of a fourth embodiment will be described.

In the third embodiment that has been described above, the terminal station 30 is provided with the base station function, and the mobile station 20 schedules the timing at which communication is enabled in the communication method B, but the terminal station 30 can also be provided with the base station function, and schedule the timing. The fourth embodiment is different from the first embodiment only in that the terminal station 30 is provided with the base station function, and schedules the timing. That is, the fourth embodiment is different from the first embodiment only in the functions of the MB control unit 21 and the TM control unit 31. It is noted that in the fourth embodiment, the mobile base station 20 of the first embodiment is called the mobile station 20.

In the fourth embodiment, the terminal station 30 is provided with the base station function, and transmits, for example, periodically, information including the terminal station ID designating the terminal station 30 and the position information of the terminal station 30 (notification channel information) by using the communication method A. When there are a plurality of terminal stations 30, radio interference is prevented, for example, by setting the transmission times of the notification channel information transmitted by the terminal stations 30 so that they are not overlapped.

The mobile station 20 of the fourth embodiment receives, for example, the terminal station (1) ID and the position information from the terminal station 30(1), and transmits information including the position information, traveling path, and traveling speed of the mobile station 20 and the mobile base station ID.

The terminal station 30 receives the information including the position information, traveling path, and traveling speed of the mobile station 20, schedules a timing at which communication with the mobile station 20 is enabled by using the communication method B, by using the position information, traveling path, and traveling speed of the mobile station 20 and the position information of the terminal station 30(1), and transmits the timing information to the mobile station 20.

Then, the mobile station 20 and the terminal station 30(1) perform data transmission by wireless communication using the communication method B at the timing.

According to the fourth embodiment, at least the same effects as (B1) and (B2) of the second embodiment are exerted.

Fifth Embodiment

Next, a fifth embodiment of the present invention will be described.

Figure 5:
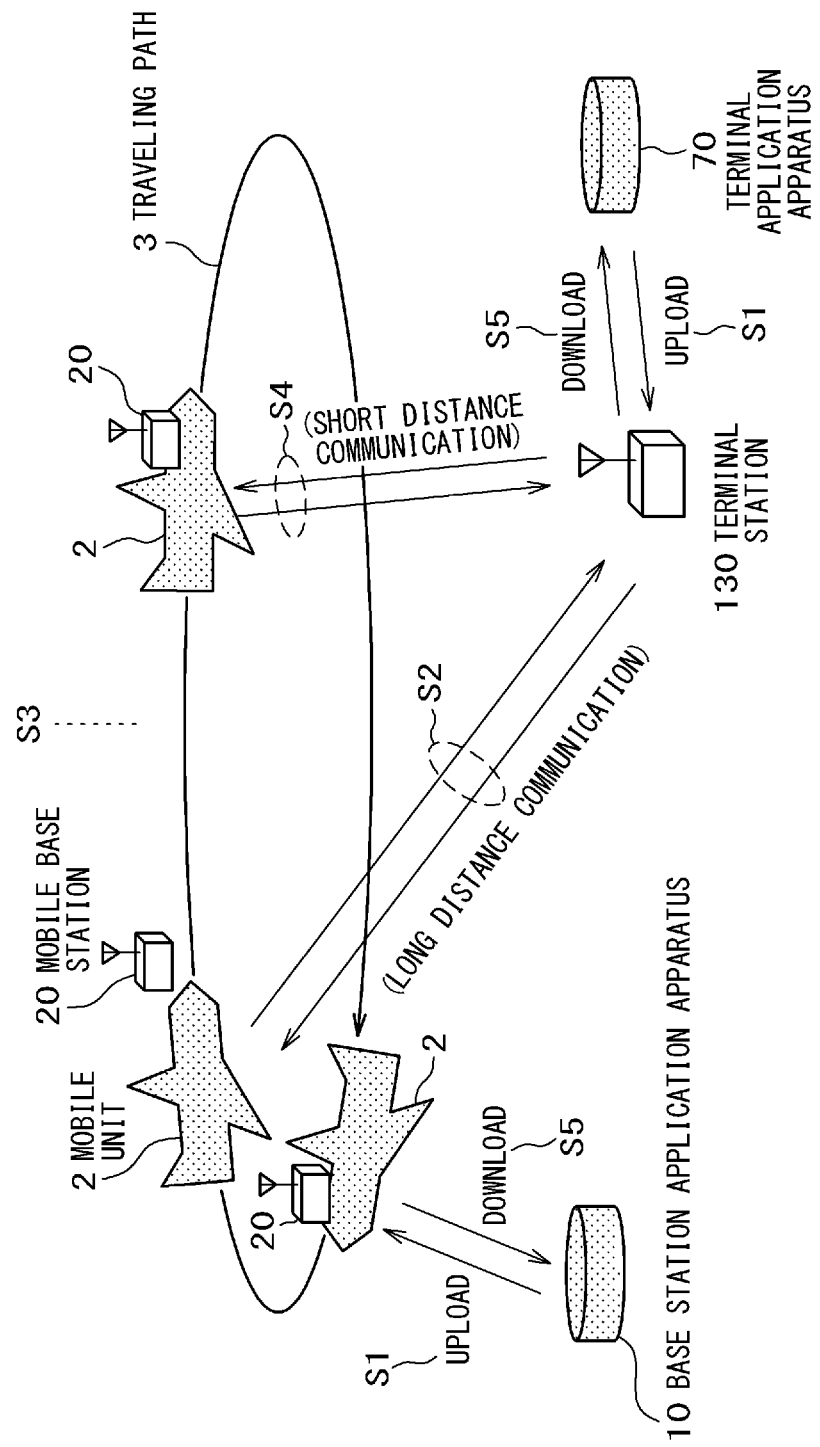
FIG. 5 is a block diagram of a wireless communication system according to a fifth embodiment of the present invention.

FIG. 5 is a block diagram of a wireless communication system according to the fifth embodiment of the present invention. In the fifth embodiment, the function of the terminal station 30 according to the first embodiment is divided into a terminal station 130 and a terminal application apparatus 70, and the configurations and operations other than these are the same as the first embodiment. The same configurations as the first embodiment are indicated by the same reference numerals, and the description thereof is omitted.

As illustrated in FIG. 5, the wireless communication system of the fifth embodiment includes the base station application apparatus 10, the mobile base station 20, the terminal station 130, and the terminal application apparatus 70.

Like the terminal station 30 of the first embodiment, the terminal station 130 is disposed in, for example, a place that a human cannot approach easily or a place where long time stay is dangerous. For example, the terminal station 130 is thrown down from, for example, the unmanned aerial vehicle and installed.

The terminal station 130 stores user information received from the mobile base station 20 once, and transmits the user information to the terminal application apparatus 70. In addition, the terminal station 130 stores user information received from the terminal application apparatus 70 once, and transmits the user information to the mobile base station 20.

The terminal application apparatus 70 is installed, for example, near the terminal station 130, and performs data transmission to and from the terminal station 130. This data transmission may be performed by wireless communication or wire communication. Alternatively, data may be stored in a storage medium, such as a magnetic disk and a semiconductor memory, and the storage medium may be transmitted and received. In the fifth embodiment, the terminal application apparatus 70 performs wire communication to and from the terminal station 130.

In the example of FIG. 5, one terminal station 130 and one terminal application apparatus 70 are provided, but a plurality of terminal stations 130 and terminal application apparatuses 70 may be provided.

Figure 6:
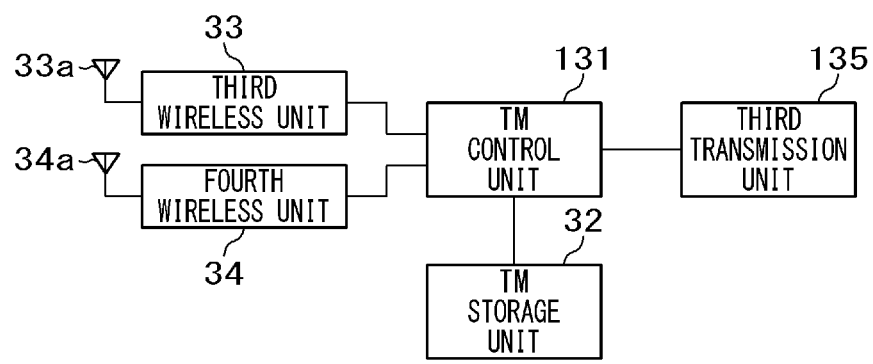
FIG. 6 is a block diagram of a terminal station according to the fifth embodiment of the present invention.

FIG. 6 is a block diagram of the terminal station according to the fifth embodiment of the present invention.

As illustrated in FIG. 6, the terminal station 130 of the fifth embodiment includes a TM control unit 131, the TM storage unit 32, the third wireless unit 33, the fourth wireless unit 34, and a third transmission unit 135. The terminal station 130 is different from the terminal station 30 of the first embodiment in the TM control unit 131 and the third transmission unit 135, and other configurations are the same as the terminal station 30 of the first embodiment. The same configurations are indicated by the same reference numerals, and the description thereof is omitted.

The TM control unit 131 controls each configuring unit of the terminal station 130 and the operation of the entire terminal station 130. For example, the TM control unit 131 transmits and receives position information to and from the mobile base station 20, and controls the start and stop of the power sources of the the third wireless unit 33 and the fourth wireless unit 34 according to the communication schedule.

The third transmission unit 135 is provided with an interface function for transmitting and receiving data to and from the terminal application apparatus 70, and is provided with the function of performing opposing communication to and from a fourth transmission unit 75 of the terminal application apparatus 70. This interface may be wireless, such as wireless LAN.

FIG. 7 is a block diagram of the terminal application apparatus according to the fifth embodiment of the present invention.

As illustrated in FIG. 7, the terminal application apparatus (TA) 70 includes a TA control unit 71, a TA storage unit 72, a TA input/output unit 73, and the fourth transmission unit 75.

The TA control unit 71 controls each configuring unit of the terminal application apparatus 70 and the operation of the entire terminal application apparatus 70. For example, the TA control unit 71 performs control that periodically obtains information via the TA input/output unit 73, and stores the information in the TA storage unit 72.

The fourth transmission unit 75 is provided with an interface function for transmitting and receiving data to and from the terminal station 130, and is provided with the function of performing opposing communication to and from the third transmission unit 135 of the terminal station 130.

The TA storage unit 72 is controlled by the TA control unit 71, holds data received from the terminal station 130, and holds data to be transmitted to the terminal station 130.

The TA input/output unit 73 includes a sensor, microphone, and camera, and is an interface that captures information obtained from them, and on the other hand, outputs a signal for operating them. That is, the TA input/output unit 73 is an input unit in which the user inputs information to be transmitted to the terminal application apparatus 70, and is also an output unit that displays information received from the terminal application apparatus 70.

The terminal application apparatus 70 can include a smartphone. In that case, the TA input/output unit 73 also includes a camera mounted on the smartphone, an extension interface, such as USB (Universal Serial Bus), and a human interface, such as a touch panel and a display.

Each of the TM control unit 131 and the TA control unit 71 is provided with, as hardware configuration, a CPU (Central Processing Unit) and a memory storing the operation program of each control unit. The CPU operates according to the operation program. The TA storage unit 72 includes a semiconductor memory (a flash memory, a RAM (Random Access Memory), and a ROM (read only memory)), and a magnetic disk.

The Operation of the Fifth Embodiment

The operation of the wireless communication system of the fifth embodiment will be described below with reference to FIG. 5. The operation of the fifth embodiment is also performed in the order of steps 1 to 5. The operation of the wireless communication system of the fifth embodiment is different from the operation of the wireless communication system of the first embodiment (see FIG. 1) in steps 1 and 5, and steps 1 and 5 will be described. Steps 2 to 4 are the same as the first embodiment.

It is noted that in steps 2 to 4 of the fifth embodiment, the terminal station 30 in steps 2 to 4 of the first embodiment is replaced with the terminal station 130, and the TM control unit 31 is replaced with the TM control unit 131.

Step 1: S1

Data is transmitted (uploaded) from the base station application apparatus 10 to the mobile base station 20. The data to be transmitted is the data of a file that is previously input from the BA input/output unit 13 and stored in the BA storage unit 12.

In addition, data is transmitted (uploaded) from the terminal application apparatus 70 to the terminal station 130. The data to be transmitted is the data of a file that is previously input from the TA input/output unit 73 and stored in the TA storage unit 72.

The data stored in the BA storage unit 12 and the TA storage unit 72 may be information that is subjected to the compression process and the information of an I/Q (Inphase/Quadrature) signal that is previously subjected to the base band modulation process (off-line signal process). By previously subjecting the data to such processes, the modulation process in each wireless unit of the mobile base station 20 and the terminal station 130 is not required, and the wireless unit can be reduced in size and simplified.

Next, steps 2 to 4 are performed like the first embodiment.

Step 5: S5

The mobile base station 20 returns to the base point near the base station application apparatus 10, and transmits (downloads) the data received from the terminal station 130 to the base station application apparatus 10. If in step 4, the demodulation process of the data received from the terminal station 130 is not completed, the demodulation process of the receiving signal is performed in the base station application apparatus 10.

In addition, the terminal station 130 transmits (downloads) the data received from the mobile base station 20 to the terminal application apparatus 70. If in step 4, the demodulation process of the data received from the mobile base station 20 is not completed, the demodulation process of the receiving signal is performed in the terminal application apparatus 70.

When the data communication between the base station application apparatus 10 and the terminal application apparatus 70 is repeatedly performed, steps 1 to 5 are repeatedly executed.

According to the fifth embodiment, at least the following effects are exerted.

(C1) The terminal application apparatus 70 transmits the input first information to the terminal station 130. The terminal station 130 stores the first information, and wirelessly transmits the first information to the mobile base station 20 at the timing of short distance communication to be performed. Thus, the information can be transmitted between the terminal application apparatus 70 and the base station application apparatus 10.

Sixth Embodiment

Next, a sixth embodiment of the present invention will be described.

The sixth embodiment is different from the first embodiment in that the base station application apparatus performs data transmission to and from the mobile base station 20 by wireless communication. Other configurations are the same as the first embodiment.

Figure 8:
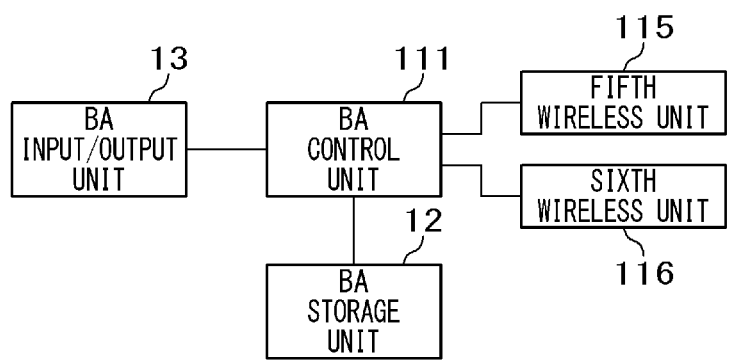
FIG. 8 is a block diagram of a base station application apparatus according to a sixth embodiment of the present invention.

FIG. 8 is a block diagram of the base station application apparatus according to the sixth embodiment of the present invention.

As illustrated in FIG. 8, a base station application apparatus (BA) 110 of the sixth embodiment includes a BA control unit 111, the BA storage unit 12, the BA input/output unit 13, a fifth wireless unit 115, and a sixth wireless unit 116. The same configurations as the base station application apparatus 10 of the first embodiment are indicated by the same reference numerals, and the description thereof is omitted.

The BA control unit 111 controls each configuring unit of the base station application apparatus 110 and the operation of the entire base station application apparatus 110.

The fifth wireless unit 115 is controlled by the BA control unit 111, and performs wireless communication to and from the first wireless unit 23 of the mobile base station 20 by using the communication method A. The sixth wireless unit 116 is controlled by the BA control unit 111, and performs wireless communication to and from the second wireless unit 24 of the mobile base station 20 by using the communication method B.

That is, the fifth wireless unit 115 and the sixth wireless unit 116 operate like the third wireless unit 33 and the fourth wireless unit 34 of the terminal station 30, respectively, and wirelessly perform data transmission between the base station application apparatus 110 and the mobile base station 20. Thus, the second transmission unit 25 of the mobile base station 20 of the first embodiment is not required.

The BA control unit 111 is provided with, as hardware configuration, a CPU (Central Processing Unit) and a memory storing the operation program of each control unit. The CPU operates according to the operation program.

According to the sixth embodiment, at least the following effects are exerted.

(D1) The application apparatus (base station application apparatus 110) is provided with the fifth wireless unit that performs wireless communication to and from the first wireless unit of the mobile communication apparatus (mobile base station 20), and the sixth wireless unit that performs wireless communication to and from the second wireless unit of the mobile communication apparatus. The mobile communication apparatus performs wireless communication between the first wireless unit and the fifth wireless unit, and determines a timing of wireless communication to be performed between the second wireless unit and the sixth wireless unit. Thus, the second transmission unit 25 of the mobile communication apparatus can be omitted, and the configuration of the mobile communication apparatus can be simplified. In addition, it is not necessary for the aerial vehicle on which the mobile communication apparatus is mounted to land for performing information transmission to and from the application apparatus. Thus, when steps 1 to 5 are repeatedly executed, the information transmission can be performed efficiently.

It is noted that the present invention is not limited to the respective embodiments, and needless to say, various modifications can be made within the scope not departing from its purport.

In addition, the present invention can be grasped, not only as the system and apparatus executing the processes according to the present invention, but also as the method executing the processes according to the present invention. Alternatively, the present invention can be grasped as the program for achieving such a method and the storage medium recording the program.

LIST OF REFERENCE SIGNS

2 . . . mobile unit,
3 . . . traveling path,
10 . . . base station application apparatus (BA: application apparatus),
11 . . . BA control unit,
12 . . . BA storage unit,
13 . . . BA input/output unit,
15 . . . first transmission unit,
20 . . . mobile base station (MB: mobile communication apparatus),
21 . . . MB control unit (mobile apparatus control unit),
22 . . . MB storage unit (mobile apparatus storage unit),
23 . . . first wireless unit,
23a . . . antenna,
24 . . . second wireless unit,
24a . . . antenna,
25 . . . second transmission unit,
30 . . . terminal station (TM: terminal device),
31 . . . TM control unit (terminal control unit),
32 . . . TM storage unit (terminal storage unit),
33 . . . third wireless unit,
33a . . . antenna,
34 . . . fourth wireless unit,
34a . . . antenna,
35 . . . TM input/output unit (terminal input/output unit),
39 . . . terminal application apparatus,
70 . . . terminal application apparatus (TA),
71 . . . TA control unit,
72 . . . TA storage unit,
73 . . . TA input/output unit,
75 . . . fourth transmission unit,
110 . . . base station application apparatus (BA),
111 . . . BA control unit,
115 . . . fifth wireless unit,
116 . . . sixth wireless unit,
130 . . . terminal station (TM),
131 . . . TM control unit,
135 . . . third transmission unit

The invention claimed is:

1. A wireless communication system comprising:
a mobile communication apparatus that performs communication while moving, and
a terminal device that performs wireless communication to and from the mobile communication apparatus,
wherein the mobile communication apparatus comprises:
a first wireless unit that wirelessly communicates control information to and from the terminal device in a first communication method; and
a second wireless unit that wirelessly communicates user information to and from the terminal device in a second communication method that uses a higher frequency band than the first communication method,
wherein the terminal device comprises:
a third wireless unit that performs wireless communication to and from the first wireless unit; and
a fourth wireless unit that performs wireless communication to and from the second wireless unit,
wherein the mobile communication apparatus or the terminal device determines a timing of wireless communication to be performed between the second wireless unit and the fourth wireless unit by performing wireless communication between the first wireless unit and the third wireless unit.

2. The wireless communication system according to claim 1,
wherein the mobile communication apparatus performs wireless communication to and from the terminal device by using the first wireless unit to determine the timing, transmits timing information representing the timing to the terminal device by using the first wireless unit, and thereafter, performs communication to and from the terminal device by using the second wireless unit at the timing,
wherein the terminal device receives the timing information by the third wireless unit, and performs communication to and from the mobile communication apparatus by using the fourth wireless unit at the timing represented by the received timing information.

3. The wireless communication system according to claim 2,
wherein the mobile communication apparatus performs wireless communication between the first wireless unit and the third wireless unit, obtains the position information of the terminal device from the terminal device, and determines the timing by using the terminal position information and the position information, traveling path, and traveling speed of the mobile communication apparatus.

4. The wireless communication system according to claim 1,
wherein the terminal device performs wireless communication to and from the mobile communication apparatus by using the third wireless unit to determine the timing, transmits timing information representing the timing to the mobile communication apparatus by using the third wireless unit, and thereafter, performs communication to and from the mobile communication apparatus by using the fourth wireless unit at the timing,
wherein the mobile communication apparatus receives the timing information by the first wireless unit, and performs communication to and from the terminal device by using the second wireless unit at the timing represented by the received timing information.

5. The wireless communication system according to claim 4,
wherein the terminal device performs wireless communication between the first wireless unit and the third wireless unit, obtains the position information, traveling path, and traveling speed of the mobile communication apparatus from the mobile communication apparatus, and determines the timing by using the position information, traveling path, and traveling speed of the mobile communication apparatus and the position information of the terminal device.

6. The wireless communication system according to claim 1,
wherein the wireless communication system further comprises an application apparatus that performs communication to and from the mobile communication apparatus,
wherein the application apparatus comprises:
a BA input/output unit to which various information is input and that outputs various information;
a BA storage unit that stores information that is input from the BA input/output unit; and
a first transmission unit that performs communication to and from the mobile communication apparatus,
wherein the mobile communication apparatus is provided with:
a second transmission unit that performs communication to and from the application apparatus; and
a mobile apparatus storage unit that stores information transmitted from the application apparatus via the second transmission unit,
wherein the application apparatus transmits first information stored in the BA storage unit to the mobile communication apparatus via the first transmission unit,
wherein the mobile communication apparatus receives the first information by the second transmission unit, stores the received first information in the mobile apparatus storage unit, and transmits the stored first information to the terminal device by using the second wireless unit at the timing,
wherein the terminal device receives the timing information by the third wireless unit, and receives the first information from the mobile communication apparatus by using the fourth wireless unit at the timing represented by the received timing information.

7. The wireless communication system according to claim 6,
wherein the application apparatus transmits the first information, as IQ information that is the value of an IQ signal subjected to the modulation process in the second wireless unit with respect to the first information, to the mobile communication apparatus via the first transmission unit,
wherein the mobile communication apparatus receives the IQ information by the second transmission unit from the application apparatus, stores the received IQ information in the mobile apparatus storage unit, and transmits the stored IQ information to the terminal device by using the second wireless unit at the timing.

8. The wireless communication system according to claim 1,
wherein the wireless communication system further comprises an application apparatus that performs communication to and from the mobile communication apparatus, wherein the application apparatus comprises a first transmission unit that performs communication to and from the mobile communication apparatus, wherein the terminal device further comprises:

a terminal input/output unit to which various information is input and that outputs various information; and a terminal storage unit that stores information that is input from the terminal input/output unit, wherein the mobile communication apparatus further comprises:

a second transmission unit that performs communication to and from the application apparatus; and a mobile apparatus storage unit that stores information wirelessly transmitted from the terminal device via the second wireless unit, wherein the terminal device wirelessly transmits second information stored in the terminal storage unit to the mobile communication apparatus via the fourth wireless unit at the timing, wherein the mobile communication apparatus receives the second information by the second wireless unit, stores the received second information in the mobile apparatus storage unit, and transmits the stored second information to the application apparatus by using the second transmission unit, wherein the application apparatus receives the second information from the mobile communication apparatus by using the first transmission unit.

9. The wireless communication system according to claim 1, wherein the wireless communication system further comprises an application apparatus that performs communication to and from the mobile communication apparatus, wherein the application apparatus comprises:

a BA input/output unit to which various information is input and that outputs various information;

a BA storage unit that stores information that is input from the BA input/output unit;

a fifth wireless unit that performs wireless communication to and from the first wireless unit; and a sixth wireless unit that performs wireless communication to and from the second wireless unit, wherein the mobile communication apparatus performs wireless communication between the first wireless unit and the fifth wireless unit, and determines a timing of wireless communication to be performed between the second wireless unit and the sixth wireless unit.

10. The wireless communication system according to claim 1, wherein at least one of the mobile communication apparatus and the terminal device performs wireless communication between the second wireless unit and the fourth wireless unit at the timing, and stops the operation of the second wireless unit or the fourth wireless unit.

11. The wireless communication system according to claim 1, wherein the terminal device stops the wireless communication of the third wireless unit after determining the timing, performs wireless communication between the second wireless unit and the fourth wireless unit, and restarts the wireless communication of the third wireless unit.

12. The wireless communication system according to claim 1, wherein the first communication method communicates a signal having a narrower bandwidth and a higher output than the second communication method.

13. A mobile communication apparatus that performs communication to and from a terminal device while moving comprising:

a first wireless unit that wirelessly communicates control information to and from the terminal device in a first communication method; and a second wireless unit that wirelessly communicates user information to and from the terminal device in a second communication method that uses a higher frequency band than the first communication method, wherein the mobile communication apparatus determines a timing of wireless communication to be performed by using the second wireless unit by performing wireless communication to and from the terminal device by using the first wireless unit.

14. The mobile communication apparatus according to claim 13, further comprising:

a transmission unit that performs communication to and from an application apparatus; and a mobile apparatus storage unit that stores user information transmitted from the application apparatus via the transmission unit, wherein the mobile communication apparatus receives the user information by the transmission unit, stores the received user information in the mobile apparatus storage unit, and transmits the stored user information to the terminal device by using the second wireless unit at the timing.

15. A terminal device that performs wireless communication to and from a mobile communication apparatus that performs communication while moving comprising:

a third wireless unit that wirelessly communicates control information to and from the mobile communication apparatus in a first communication method; and a fourth wireless unit that wirelessly communicates user information to and from the mobile communication apparatus in a second communication method that uses a higher frequency band than the first communication method, wherein the terminal device determines a timing of wireless communication to be performed by using the fourth wireless unit by performing wireless communication to and from the mobile communication apparatus by using the third wireless unit.

\* \* \* \* \*